United States Patent
Indukuru et al.

(10) Patent No.: US 7,617,385 B2
(45) Date of Patent: Nov. 10, 2009

(54) METHOD AND APPARATUS FOR MEASURING PIPELINE STALLS IN A MICROPROCESSOR

(75) Inventors: Venkat Rajeev Indukuru, Austin, TX (US); Alexander Erik Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 11/675,112

(22) Filed: Feb. 15, 2007

(65) Prior Publication Data

US 2008/0201566 A1   Aug. 21, 2008

(51) Int. Cl.
*G06F 11/28* (2006.01)
(52) U.S. Cl. .................... 712/220; 712/227
(58) Field of Classification Search .......... 712/220
See application file for complete search history.

(56) References Cited

U.S. PATENT DOCUMENTS

| | | | | |
|---|---|---|---|---|
| 5,712,996 A | * | 1/1998 | Schepers | 712/216 |
| 5,941,983 A | * | 8/1999 | Gupta et al. | 712/214 |
| 5,949,971 A | * | 9/1999 | Levine et al. | 714/47 |
| 5,958,041 A | * | 9/1999 | Petolino et al. | 712/214 |
| 6,970,999 B2 | | 11/2005 | Kurihara et al. | |
| 7,047,398 B2 | | 5/2006 | Kurihara et al. | |
| 7,197,629 B2 | * | 3/2007 | Paulraj | 712/227 |
| 7,246,219 B2 | * | 7/2007 | Samra et al. | 712/218 |

OTHER PUBLICATIONS

Liu, Y., et al., Scaling the Issue Window with Look-Ahead Latency Prediction, 2004, ACM, pp. 217-226.*
Canal, R. et al., Reducing the Complexity of the Issue Logic., 2001, ACM, pp. 312-320.*

* cited by examiner

*Primary Examiner*—Eric Coleman
(74) *Attorney, Agent, or Firm*—Yee & Associates, P.C.; Diana R. Gerhardt

(57) ABSTRACT

A computer implemented method, apparatus, and computer program product for monitoring execution of instructions in an instruction pipeline. The process identifies a number of stall cycles for a group of instructions to complete execution. The process retrieves a deterministic latency pattern corresponding to the group of instructions. The process compares the number of stall cycles to the deterministic execution latency pattern. The process identifies the instruction as a dependent instruction in response to a determination that an instruction in the group of instructions completed a deterministic number of cycles after an antecedent instruction completed.

19 Claims, 5 Drawing Sheets

METHOD AND APPARATUS FOR MEASURING PIPELINE STALLS IN A MICROPROCESSOR

BACKGROUND OF THE INVENTION

1. Field of the Invention

The present application is related generally to a data processing system and in particular to a method and apparatus for performance monitoring. More particularly, the present application is directed to a computer implemented method, apparatus, and computer usable program code for identifying stall cycles attributable to a given instruction in a group of instructions executing in an instruction pipeline.

2. Description of the Related Art

Performance monitoring of microprocessors includes the calculation of the average cycles per instruction (CPI) required to complete execution of an instruction. Typically, a reduced instruction set computer (RISC) microprocessor is capable of completing the execution of one or more instructions during a single processor clock cycle.

An instruction is generally executed in stages or components. The components for completing execution of an instruction typically include fetching the instruction, decoding the instruction, performing the operation, and writing the result of the operation to memory and/or a register. When the result is written to memory and/or a register, the result of performing the operation becomes visible or available to other instructions and processes.

Processor performance can be analyzed by breaking the cycles per instruction into components of execution to determine which parts of the instruction execution are consuming the most processor cycles. In processors that execute instructions out of order or speculatively, it is more convenient or accurate to study the performance of the components of execution after the instruction completes.

Processor cycles consumed during execution of an instruction or group of instructions without an instruction completing are referred to as stall cycles. Stall accounting is the process of monitoring stall cycles, identifying which instruction is responsible for the stall, and determining a reason for the stall.

If a user knows which instruction is stalling and a reason for the stall, the user may be able to correct the problem to avoid or reduce the number of stall cycles. For example, if a load instruction is causing excessive stall cycles due to memory access for a needed data value, the number of stall cycles can be reduced by caching the needed data value.

In processors that complete one instruction at a time, stall accounting is fairly straightforward. Any stall occurring is attributable to the one instruction that completed. However, processors that complete groups of instructions in an instruction pipeline, such as the IBM® POWER5®, are more difficult to analyze.

In an instruction pipeline, multiple instructions in various stages of component execution are being handled in an assembly line fashion by the processor. While the operation of one instruction is being executed by the arithmetic and logic unit (ALU), a next instruction can be loaded to cache and a result of executing another instruction can be written to a register. A group of two or more instructions can be handled at various stages of completion at the same time. Execution of the group of instructions is not complete until every instruction in the group is complete. If completion of the group stalls, the stall cycles could be due to a stall occurring in any one or more of the instructions in the group.

There may not be a single reason that completion of the group of instructions stalled because each instruction can have its own reason for stalling. However, within the individual instruction blockages, a reason may exist which blocks the entire group. For example, a stall occurring in the last instruction to complete results in the completion of the entire group stalling.

Currently, performance monitoring identifies the source for the last instruction completion delay in a group of instructions and attributes this source as the reason for the entire group stalling. This method is useful for analysis but may not accurately describe completion delays encountered by the group of instructions. Moreover, current methods that attribute the entire delay in completion encountered by a group of instructions to the last known delay can result in misleading stall accounting if one or more instructions in the group are dependent on completion of another instruction in the group.

SUMMARY OF THE INVENTION

The illustrative embodiments provide a computer implemented method, apparatus, and computer usable program code for monitoring execution of instructions in an instruction pipeline. In one embodiment, the process counts a number of stall cycles for a group of instructions. The process retrieves a deterministic latency pattern corresponding to the group of instructions. The process compares the number of stall cycles to the deterministic latency pattern. The process identifies the instruction as a dependent instruction in response to a determination that an instruction in the group of instructions completed a deterministic number of cycles after an antecedent instruction completed.

In another embodiment, the process counts a number of stall cycles occurring after an antecedent instruction completed execution to form a dependent instruction delay. In response to a determination that the dependent instruction delay equals a deterministic instruction delay identified in the deterministic latency pattern, the process commits the dependent instruction delay as the execution delay attributable to the dependent instruction. The deterministic latency pattern includes a predetermined number of cycles expected to occur for a dependent instruction to complete execution after an antecedent instruction completes execution.

In another embodiment, the dependent instruction delay is subtracted from the number of stall cycles for the group to determine an antecedent instruction delay attributable to the antecedent instruction.

In another embodiment, the process identifies an operation performed by each instruction in the group of instructions. The process then identifies a deterministic latency pattern from a plurality of deterministic latency patterns based on the identified operations performed by each instruction in the group of instructions. In one embodiment, the deterministic latency pattern is retrieved from a plurality of deterministic latency patterns hard coded in transistors on a processor chip. In another embodiment, the deterministic latency pattern is retrieved from memory on the processor chip.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
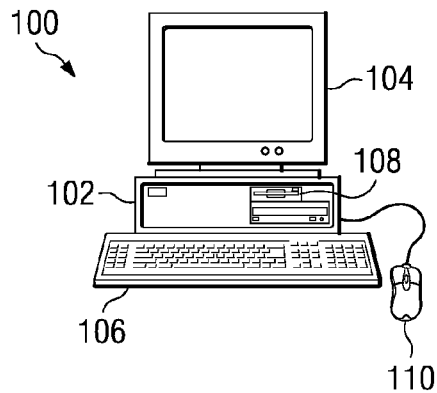
FIG. 1 is a pictorial representation of a data processing systems in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
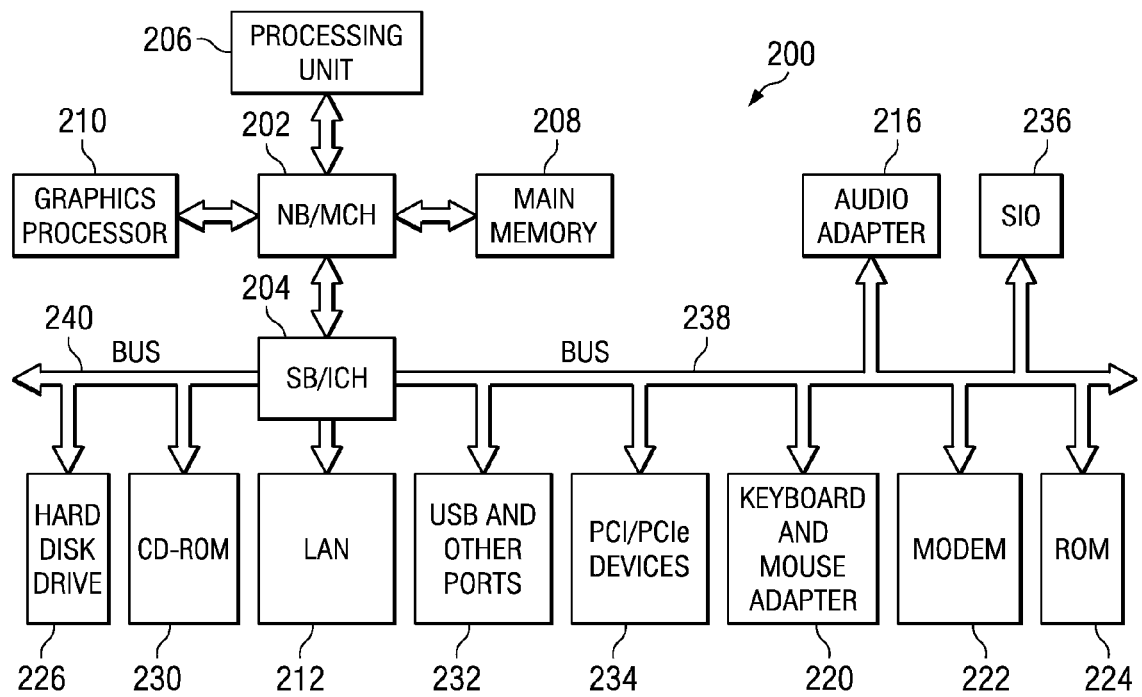
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

Figure 3:
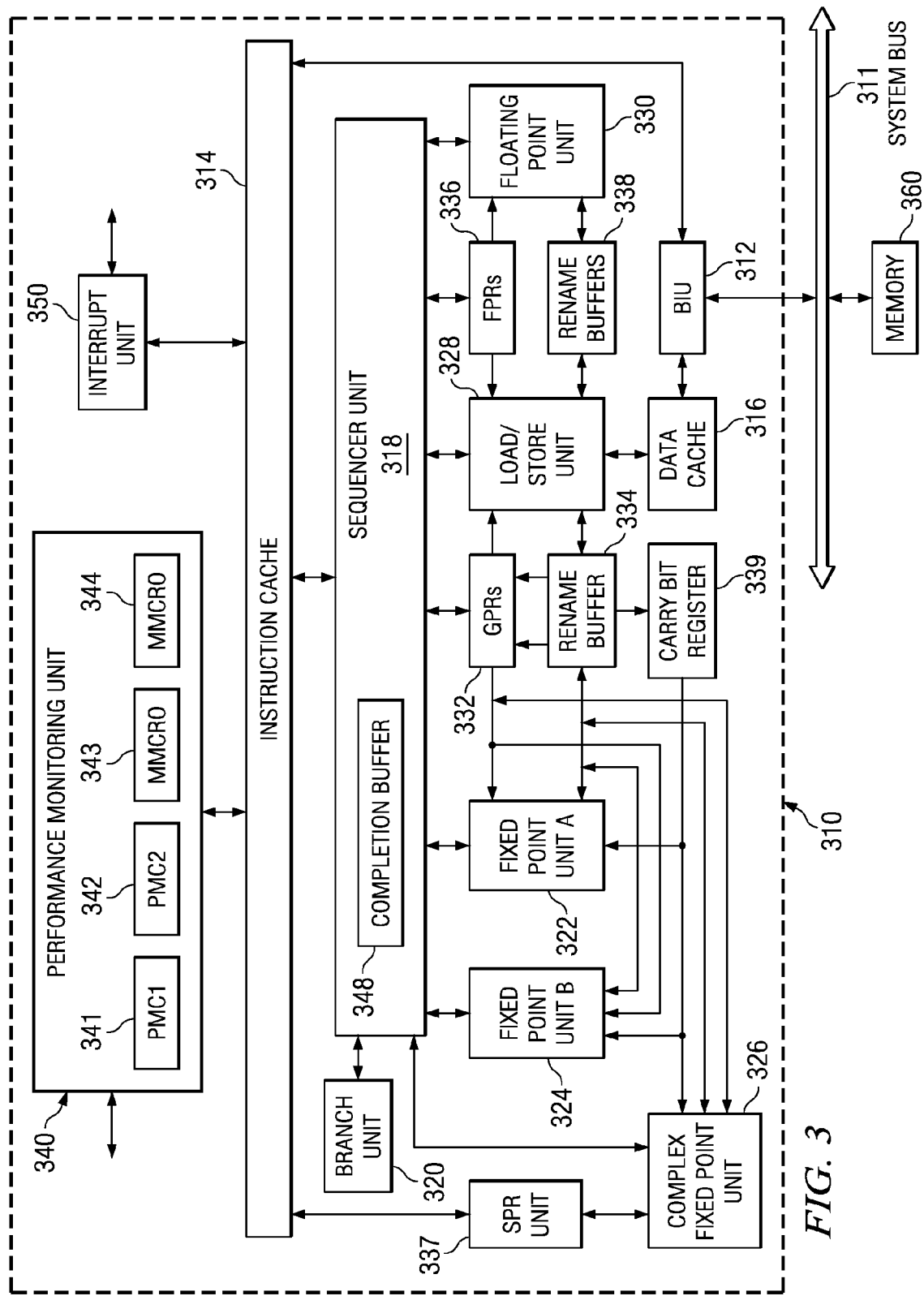
FIG. 3 is a block diagram of a processor system for processing information in accordance with an illustrative embodiment.

Turning next to FIG. 3, a block diagram of a processor system for processing information is depicted in accordance with an illustrative embodiment of the present invention. Processor 310 may be implemented as processor 102 in FIG. 1.

In an illustrative embodiment, processor 310 is a single integrated circuit superscalar microprocessor. Accordingly, as discussed further herein below, processor 310 includes various units, registers, buffers, memories, and other sections, all of which are formed by integrated circuitry. Also, in the illustrative embodiment, processor 310 operates according to reduced instruction set computer (RISC) techniques. As shown in FIG. 3, system bus 311 is connected to a bus interface unit (BIU) 312 of processor 310. BIU 312 controls the transfer of information between processor 310 and system bus 311.

BIU 312 is connected to an instruction cache 314 and to data cache 316 of processor 310. Instruction cache 314 outputs instructions to sequencer unit 318. In response to such instructions from instruction cache 314, sequencer unit 318 selectively outputs instructions to other execution circuitry of processor 310.

In addition to sequencer unit 318, in the illustrative embodiment, the execution circuitry of processor 310 includes multiple execution units, namely a branch unit 320, a fixed-point unit A (FXUA) 322, a fixed-point unit B (FXUB) 324, a complex fixed-point unit ("CFXU") 326, a load/store unit (LSU) 328, and a floating-point unit (FPU) 330. FXUA 322, FXUB 324, CFXU 326, and LSU 328 receive source operation information as inputs from general-purpose architectural registers (GPRs) 332 and fixed-point rename buffers 334. Moreover, FXUA 322 and FXUB 324 input a "carry bit" from a carry bit (CA) register 339. FXUA 322, FXUB 324, CFXU 326, and LSU 328 output results (destination operand information) of their operations for storage at selected entries in fixed-point rename buffers 334. Also, CFXU 326 inputs and outputs source operand information and destination operand information to and from special-purpose register processing unit (SPR unit) 337.

FPU 330 inputs its source operand information from floating-point architectural registers (FPRs) 336 and floating-point rename buffers 338. FPU 330 outputs results of its operation for storage at selected entries in floating-point rename buffers 338.

In response to a Load instruction, LSU 328 inputs information from data cache 316 and copies such information to selected ones of rename buffers 334 and 338. If such information is not stored in data cache 316, then data cache 316 inputs such information from system memory 360, which connects to system bus 311. Moreover, data cache 316 is able to output information from data cache 316 to system memory 360 connected to system bus 311 through BIU 312 and system bus 311. One of GPRs 332 and FPRs 336 send a Store instruction to LSU 328 in these examples. In response to a Store instruction, LSU 328 inputs information from a selected one of GPRs 332 and FPRs 336 and copies such information to data cache 316.

Sequencer unit 318 inputs and outputs information to and from GPRs 332 and FPRs 336. From sequencer unit 318, branch unit 320 inputs instructions and signals indicating a present state of processor 310. In response to such instructions and signals, branch unit 320 outputs signals indicating suitable memory addresses storing a sequence of instructions for execution by processor 310 to sequencer unit 318. In response to such signals from branch unit 320, sequencer unit 318 inputs the indicated sequence of instructions from instruction cache 314. If one or more of the sequence of instructions is not stored in instruction cache 314, then instruction cache 314 inputs such instructions from system memory 360 connected to system bus 311.

In response to the instructions input from instruction cache 314, sequencer unit 318 selectively dispatches the instructions to selected ones of execution units 320, 322, 324, 326, 328, and 330. Each execution unit executes one or more instructions of a particular class of instructions. For example, FXUA 322 and FXUB 324 execute a first class of fixed-point mathematical operations on source operands, such as addition, subtraction, ANDing, ORing and XORing. CFXU 326 executes a second class of fixed-point operations on source operands, such as fixed-point multiplication and division. FPU 330 executes floating-point operations on source operands, such as floating-point multiplication and division.

As information is stored at one of rename buffers 334, such information is associated with a storage location as specified by the instruction for which the selected rename buffer is allocated. For example, information may be associated with a storage location such as one of GPRs 332 or carry bit (CA) register 342. Information stored at a selected one of rename buffers 334 is copied to its associated one of GPRs 332 or CA register 342 in response to signals from sequencer unit 318. Sequencer unit 318 directs such copying of information stored at a selected one of rename buffers 334 in response to "completing" the instruction that generated the information. This type of copying is called a "writeback."

As information is stored at a selected one of rename buffers 338, such information is associated with one of FPRs 336. Information stored at a selected one of rename buffers 338 is copied to its associated one of FPRs 336 in response to signals from sequencer unit 318. Sequencer unit 318 directs such copying of information stored at a selected one of rename buffers 338 in response to "completing" the instruction that generated the information.

Processor 310 achieves high performance by processing multiple instructions simultaneously at various ones of execution units 320, 322, 324, 326, 328, and 330. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 318 selectively inputs from instruction cache 314 one or more instructions from one or more memory addresses storing the sequence of instructions discussed further hereinabove in connection with branch unit 320, and sequencer unit 318. In the decode stage, sequencer unit 318 decodes up to four fetched instructions.

In the dispatch stage after instructions are decoded in the decoding stage, sequencer unit 318 selectively dispatches up to four decoded instructions to selected ones of execution units 320, 322, 324, 326, 328, and 330 after reserving rename buffer entries for the dispatched instructions' results. These results may be operand information. In the dispatch stage, operand information is supplied to the selected execution units for dispatched instructions. Processor 310 dispatches instructions in order of their programmed sequence.

In the execute stage, execution units execute their dispatched instructions and output results of their operations for storage at selected entries in rename buffers 334 and rename buffers 338 as discussed further hereinabove. In these examples, the results are operand information. In this manner, processor 310 is able to execute instructions out-of-order relative to their programmed sequence.

In the completion stage, sequencer unit 318 indicates an instruction is "complete." Processor 310 "completes" instructions in order of their programmed sequence.

In the writeback stage, sequencer 318 directs the copying of information from rename buffers 334 and 338 to GPRs 332 and FPRs 336, respectively. Sequencer unit 318 directs such copying of information stored at a selected rename buffer. Likewise, in the writeback stage of a particular instruction, processor 310 updates its architectural states in response to the particular instruction. Processor 310 processes the respective "writeback" stages of instructions in order of their programmed sequence. Processor 310 advantageously merges an instruction's completion stage and writeback stage in specified situations.

In the illustrative embodiment, each instruction requires one machine cycle to complete each of the stages of instruction processing. Nevertheless, some instructions, such as complex fixed-point instructions executed by CFXU 326, may require more than one cycle. Accordingly, a variable delay may occur between a particular instruction's execution and completion stages in response to the variation in time required for completion of preceding instructions.

Completion buffer 348 is provided within sequencer 318 to track the completion of the multiple instructions which are being executed within the execution units. Upon an indication that an instruction or a group of instructions have been completed successfully, in an application specified sequential order, completion buffer 348 may be utilized to initiate the transfer of the results of those completed instructions to the associated general-purpose registers. As used herein, a group of instructions contains two or more instructions.

In addition, processor 310 also includes performance monitor unit 340, which is connected to instruction cache 314 as well as other units in processor 310. Operation of processor 310 can be monitored utilizing performance monitor unit 340, which in this illustrative embodiment is a software-accessible mechanism capable of providing detailed information descriptive of the utilization of instruction execution resources and storage control. Although not illustrated in FIG. 3, performance monitor unit 340 couples to each functional unit of processor 310 to permit the monitoring of all aspects of the operation of processor 310, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 340 includes an implementation-dependent number of counters 341-342, labeled PMC1 and PMC2, which are utilized to count occurrences of selected events. The events of interest also may include, for example, time for instruction decode, execution of instructions, branch events, cache misses, and cache hits.

Performance monitor unit 340 further includes at least one monitor mode control register (MMCR). In this example, two control registers, MMCRs 343 and 344 are present that specify the function of counters 341-342. Counters 341-342 and MMCRs 343-344 are preferably implemented as SPRs that are accessible for read or write via MFSPR and MTSPR instructions executable by CFXU 326. However, in one alternative embodiment, counters 341-342 and MMCRs 343-344 may be implemented simply as addresses in I/O space. In another alternative embodiment, the control registers and counters may be accessed indirectly via an index register.

The various components within performance monitoring unit 340 may be used to generate data for performance analysis. Depending on the particular implementation, the different components may be used to generate trace data. In other illustrative embodiments, performance unit 340 may provide data for time profiling with support for dynamic address to name resolution.

Additionally, processor 310 also includes interrupt unit 350, which is connected to instruction cache 314. Additionally, although not shown in FIG. 3, interrupt unit 350 is connected to other functional units within processor 310. Interrupt unit 350 may receive signals from other functional units and initiate an action, such as starting an error handling or trap process. In these examples, interrupt unit 350 is employed to generate interrupts and exceptions that may occur during execution of a program.

The depicted examples in FIGS. 1-3 and above-described examples are not meant to imply architectural limitations. For example, data processing system 200 also may be a tablet computer, laptop computer, or telephone device in addition to taking the form of a PDA. Moreover, processor 310 can include a multi-core microprocessor and/or a complex instruction set computer (CISC) processor. The depicted examples in FIGS. 1-3 are illustrative embodiments and are not meant to imply architectural limitations.

Performance monitoring of microprocessors includes the calculation of the average cycles per instruction (CPI) required to complete execution of an instruction. An instruction typically includes an opcode. The opcode is a portion of a machine language instruction that designates the type of operation to be performed by the instruction. For example, an instruction operation can include, but is not limited to, a load operation or a mathematical operation, such as an add operation or a divide operation. Typically, a reduced instruction set computer (RISC) microprocessor is capable of completing the execution of one or more instructions during a single processor clock cycle. A reduced instruction set computer is a computer whose processor can execute a set of simple instructions very rapidly.

An instruction is generally executed in components of completion, which include fetching the instruction, decoding the instruction, performing the operation, and writing the result of the operation to memory and/or a register. For example, performing the operation could include performing a mathematical operation, such as an add operation, by the arithmetic and logic unit (ALU) of the microprocessor. An instruction is complete when the result is written to memory and/or a register, at which time the result becomes visible or available to other instructions and independent processes.

When an instruction is consuming a relatively large number of processor cycles to reach completion and/or fails to reach completion, the cycles consumed without an instruction completing are referred to as stall cycles. In processors that complete one instruction at a time, it is fairly straightforward to identify which instruction is stalling and identify a reason for the stall.

However, processors that complete instructions in groups, such as in an instruction pipeline, are more difficult to analyze. In such a case, execution of the group of instructions is not complete until every instruction in the group is complete.

Thus, if completion of the group stalls, the stall could be due to a stall occurring in any of the instructions in the group.

Currently, performance monitoring identifies the source for the last instruction completion delay in a group of instructions and attributes this source as the reason for the entire group stalling. Performance monitoring is the monitoring of a program's performance to gather information regarding program speed, memory usage, and efficiency, such as the number of cycles per instruction for an instruction or group of instructions to complete. The information gathered by performance monitoring can be used to optimize a program or set of instructions for increased processing speed and greater efficiency.

In current solutions, a performance monitor unit speculatively starts counting stall events on any cycle that does not have a group of instructions completing. The last event to clear is considered the stall reason for the entire group of instructions and is committed as the reason for the stall. The performance monitor unit considers all other stall reasons to be invalid and discards those reasons. This method of identifying the reason for the last instruction stall is useful for analysis but may not accurately describe the execution completion delays encountered by the group of instructions where instructions in the group are interdependent.

For example, in a group of instructions that includes a load instruction and two add instructions, if the first add instruction requires a data value provided by the load instruction, and the second add instruction requires the result of the first add instruction, then the first add is dependent upon the load instruction and the second add is dependent on the first add.

The illustrative embodiments recognize that if the load instruction in the above example stalls, the first and second add instructions will also stall because the first and second adds are dependent instructions. A dependent instruction is an instruction that depends upon another instruction for execution of the dependent instruction to complete. Thus, it would be both inaccurate and misleading to attribute the stall in the group to the second add instruction, even if the second add instruction is the last to complete.

The illustrative embodiments also recognize that even if the first and second add instructions were removed from the group of instructions, the group of instructions would still encounter a stall in completion due to the stall occurring in the load instruction. Therefore, a user would be unable to improve the performance of the group of instructions based on an identification of the last instruction as the stall reason. Thus, current methods which identify the source of a completion stall in a group as the last instruction may be inadequate and misleading where instructions in a group of instructions are interdependent.

Therefore, the illustrative embodiments provide a computer implemented method, apparatus, and computer program product for monitoring execution of instructions in an instruction pipeline. The process counts a number of stall cycles for a group of instructions to complete execution. The process retrieves a deterministic latency pattern for the group of instructions. The process compares the number of stall cycles to the deterministic execution latency pattern. The process identifies the instruction as a dependent instruction in response to a determination that an instruction in the group of instructions completed a deterministic number of cycles after an antecedent instruction. An antecedent instruction is an instruction upon which a dependent instruction is dependent. For example, if an add instruction needs a data value provided by a load instruction, the load instruction is an antecedent instruction to the add instruction. The add instruction is a dependent instruction because the add instruction depends on the results of the load instruction for completion.

Figure 4:
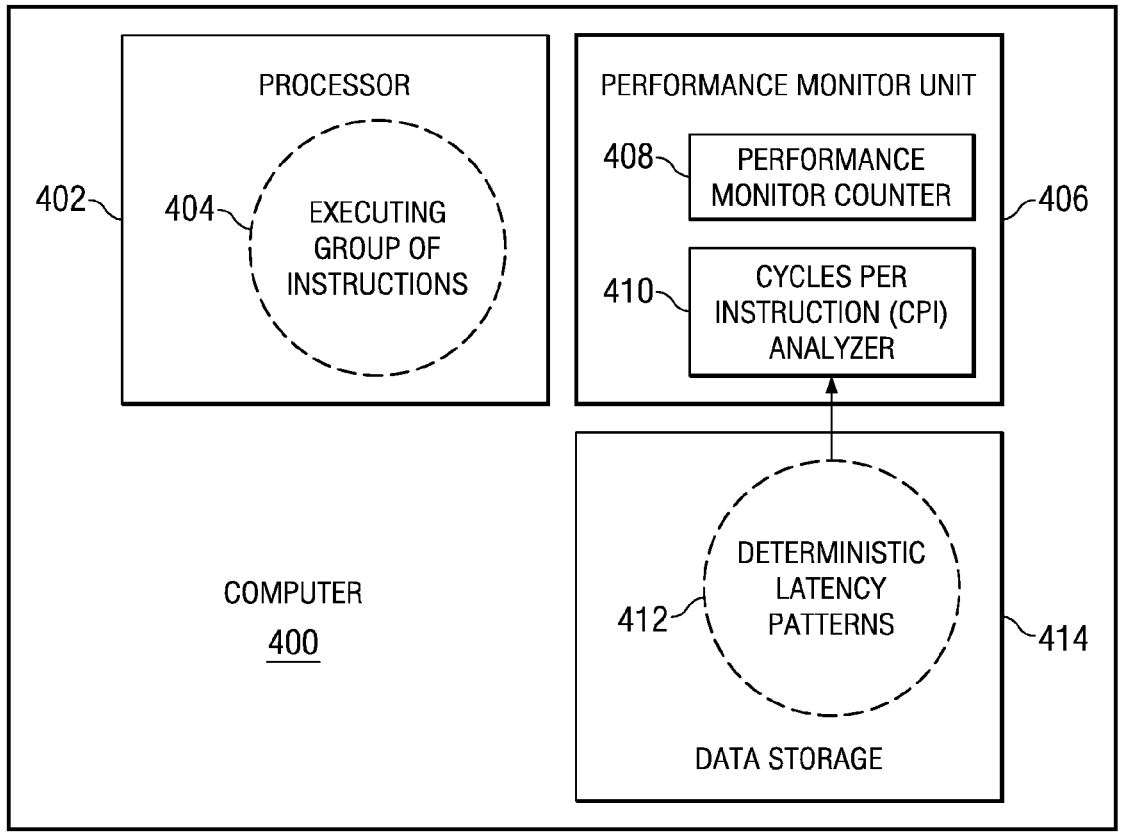
FIG. 4 a block diagram illustrating a dataflow when deterministic execution values are used for stall accounting in an instruction pipeline in accordance with an illustrative embodiment.

FIG. 4 is a block diagram illustrating a dataflow when deterministic execution values are used for stall accounting in an instruction pipeline in accordance with an illustrative embodiment. Stall accounting is a method for identifying an instruction causing a stall and a reason for the stall. Computer 400 can be implemented in any type of computing device, such as a personal computer, laptop, personal digital assistant, or any other computing device depicted in FIGS. 1 and 2. In this illustrative example, computer 400 is a reduced instruction set computer.

Processor 402 is any type of known or available processor for executing instructions on computer 400, including but not limited to, a central processing unit (CPU). The illustrative embodiments could be implemented in single core processor, a multi-core processor, or a multiprocessor. For example, processor 402 may be a cell broadband engine (BE) chip processor. For example, processor 402 may be a Cell Broadband Engine™ (BE) processor, which is a multi-core processor chip comprised of a single primary 64-bit Power PC® processor core (PPC) and eight synergistic processor cores (SPCs). In this example, processor 402 is a processor such as processor unit 206 in FIG. 2 or processor 310 in FIG. 3.

Processor 402 is executing group of instructions 404 in an instruction pipeline. Executing group of instructions 404 includes two or more instructions. In this example, executing group of instructions is a set of five instructions. Executing group of instructions 404 is not completed until every instruction in executing group of instructions 404 is completed. Therefore, if a stall occurs during execution of one or more instructions in executing group of instructions 404, the entire group of instructions may stall.

Performance monitor unit 406 is a hardware component on a microprocessor chip on which processor 402 is located in computer 400. Performance monitoring unit 406 is part of the microprocessor logic on the processor chip that analyzes the performance of processor 402 during execution of each instruction. The performance of processor 402 executing group of instructions 404 is measured in clock cycles per instruction (CPI). In this example, performance monitor unit 406 is any type of known or available performance monitor unit, such as, for example, performance monitoring unit 340 in FIG. 3.

Performance monitor unit 406 includes performance monitor counter 408. Performance monitor counter 408 is a software component for counting a number of processor cycles consumed or used during execution of an instruction. For example, if processor 402 is executing a single fixed point instruction and utilizes two processor cycles during execution of a fixed point instruction, performance monitor counter 408 will count two cycles per instruction for the fixed point instruction. However, if processor 402 is executing a group of two or more instruction, performance monitor counter 408 will count the number of cycles utilized by processor 402 to complete execution of all the instructions in the group of instructions.

Performance monitor unit 406 includes cycles per instruction (CPI) analyzer 410 to identify a number of cycles per instruction attributable to dependent instructions in a group of instructions. CPI analyzer 410 is either a hardware or software component for analyzing the count of cycles utilized during execution of a group of instructions, determine whether one or more instructions in the group of instructions are dependent instructions, and identify a number of stall cycles attributable to each dependent instruction For example, if an add instruction requires a data value provided by a load instruction, the add instruction is dependent on the load instruction. In other words, the add value cannot complete until the load instruction completes. Any stall or delay in the antecedent instructions, such as the load instruction, will result in an equivalent stall or delay in any dependent instructions.

In a RISC processor, many instructions have deterministic execution latencies. A deterministic execution latency is a predetermined or expected number of processor cycles to complete execution of the dependent instruction after all antecedent instructions have completed. In other words, a deterministic execution latency is the expected delay in completion of a dependent instruction completion after all the dependencies of the dependent instruction have been satisfied. For example, an add instruction could have a deterministic execution latency of two cycles. This means that when all the dependencies for the add instruction have been met and the add operation specified by the add instruction is performed by processor 402, processor 402 is expected to consume two processor cycles. The deterministic execution latency will vary depending upon the type of operation performed, the dependencies of the instruction, and the type of processor.

When attributing stall cycles to a given instruction in the group of instructions, CPI analyzer 410 in performance monitor unit 406 uses the deterministic latencies to determine if a completing instruction was dependent on a previously completed or antecedent instruction. If the completing instruction is dependent on a previously completed instruction, CPI analyzer 410 divides the stall cycles between the two instructions based on the predetermined latency pattern for the given operations performed by the instructions.

In the example given above, if the load instruction completes and then the dependent add instruction completes, CPI analyzer 410 expects the add instruction to consume two cycles after completion of the load instruction. Thus, regardless of the number of stall cycles occurring during completion of the add instruction, if the add instruction completes two cycles after the load instruction completes, CPI analyzer 410 identifies the add instruction as being dependent on the load instruction. In other words, if the actual instruction completion delay of two cycles equals the expected deterministic latency pattern of two cycles, CPI analyzer 410 recognizes that the add instruction is dependent on the load instruction.

Deterministic latency patterns 412 are a set of one or more expected deterministic latency patterns specifying an expected number of cycles for dependent instructions to complete after all the dependencies of the dependent instructions have been satisfied. A deterministic latency pattern is an expected number of processor cycles to complete execution of a given instruction in a given group of instructions if a stall event does not occur. In other words, in a given processor, a user can determine an estimated number of processor cycles that are required to complete execution of an add instruction. For example, an add instruction may require two processor cycles to complete. Therefore, an expected or deterministic number of cycles for the add instruction to complete is two cycles.

Likewise, in a group of instructions that include two add instructions, a user can determine that two cycles are expected to complete each add instruction and four cycles are expected to occur for completion of both add instructions. This is a deterministic latency pattern for the group of two add instructions. In other words, the deterministic latency pattern is the expected pattern of processor cycles expected to be consumed for a given group of instructions to complete based on the operations performed by each instruction in the group.

Thus, if a load instruction requires four cycle to complete and a group of instructions includes one load instruction and two add instructions, the deterministic latency pattern for this group may be four processor cycles for the load instruction, two processor cycles for the first add instruction and two processor cycles for the second add instruction.

The deterministic latency pattern varies depending on the type of processor, the operation performed by the instruction, the pattern of dependencies of the instructions, and the operations performed by the group of instructions. However, the expected number of cycles for various groups of instructions can be predetermined and stored in a data storage device, such as data storage 414. Thus, CPI analyzer 410 can access deterministic latency patterns 412 to identify a pattern of cycles for a group of instructions matching executing group of instructions 404 in processor 402.

CPI analyzer 410 compares the actual cycles per instruction count for the group of instructions counted by performance monitor counter 408 after the group of instructions completes execution. CPI analyzer 410 determines which instructions are dependent instructions based on the comparison of the actual instruction delay for each instruction with one or more matching patterns from deterministic latency patterns 412. Based on this comparison, CPI analyzer 410 identifies which instructions are dependent instructions and which instructions are antecedent instructions.

CPI analyzer 410 determines a number of stall cycles attributable to the antecedent instruction and/or the number of stall cycles attributable to the one or more dependent instructions based on a comparison of the actual cycles per instruction count with the matching deterministic latency pattern.

Data storage 414 is any type of known or available hardware or software device for storing data. For example, data storage 414 can include data hard-coded in transistors on a processor chip, on-chip memory, off-chip memory, such as read only memory (ROM), non-volatile random access memory (NVRAM), or any other type of known or available data storage device.

Figure 5:
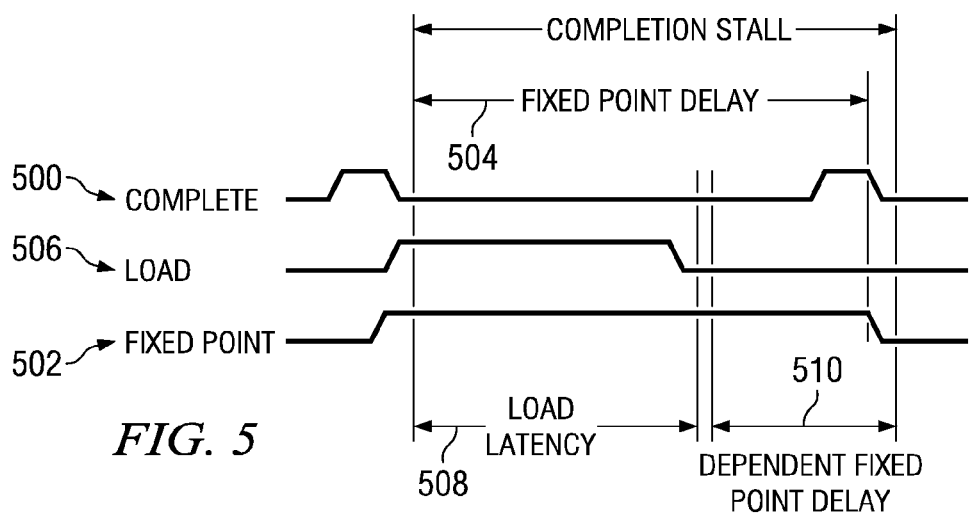
FIG. 5 is a diagram of a fixed point instruction dependent on a load instruction in accordance with an illustrative embodiment.

Referring now to FIG. 5, a timing diagram of a fixed point instruction dependent on a load instruction is shown in accordance with an illustrative embodiment. Complete signal 500 is a signal for completion of a group of instructions that includes a fixed point instruction dependent on a load instruction. During execution of the group of instructions, the performance monitor unit does not know which instructions are dependent instructions.

In this example, fixed point instruction signal 502 is a signal showing latency or stall in completion for a fixed point instruction. The fixed point instruction was the last instruction to complete in the group of instructions. Fixed point instruction signal 502 indicates a fixed point operation in a group of instructions that experienced the longest latency of the group of instructions prior to the instruction completing. Fixed point delay 504 is the actual amount of delay or stall experienced during completion of execution of the fixed point instruction.

Load instruction signal 506 indicates a load instruction in the same group of instructions that experienced latency prior to completion of the load instruction. Load latency 508 is the amount of delay in completion of the load instruction. Load latency 508 is less than fixed point delay 504 for the fixed point instruction signal 502. The completion stall is the total amount of delay for completion of the entire group of instructions.

Dependent fixed point delay 510 is a deterministic execution value for a fixed point instruction dependent upon a load instruction. Dependent fixed point delay 510 is not the actual count of stall cycles. Dependent fixed point delay 510 is the stall that is expected to occur after an antecedent load instruction completes before a fixed point instruction will complete if the fixed point instruction is dependent on the load instruction. Dependent fixed point delay 510 is a predetermined value in a deterministic latency pattern for the group of instructions. In other words, dependent fixed point delay 510 is the expected delay for completion of a fixed point instruction in this group of instructions A CPI analyzer, such as CPI analyzer 410 in FIG. 4, identifies a matching deterministic latency pattern to identify dependent fixed point delay 510. The CPI analyzer compares fixed point delay 504 for the fixed point instruction to dependent fixed point delay 510. If dependent fixed point delay 510 matches the stall portion of actual fixed point delay 504 occurring after the load instruction completed, then CPI analyzer identifies fixed point instruction as being dependent on the load instruction. In other words, if a fixed point instruction is dependent on a load instruction, the CPI analyzer expects the fixed point instruction to complete a deterministic number of cycles after the load instruction. A deterministic number of cycles is the predetermined number of cycles expected to be consumed before an instruction will complete. In other words, if a processor typically requires two processor cycles to complete an add instruction when no stalls occur, then the deterministic number of cycles is two processor cycles for an add instruction in this example.

In this case, fixed point delay 504 occurring after completion of the load instruction matches dependent fixed point delay 510. Thus, in this example, CPI analyzer determines that the fixed point instruction is dependent on the load instruction.

As shown above, the CPI analyzer of the performance monitor unit takes advantage of the deterministic relationship between certain events occurring during execution of a group of instructions to split apart stall periods, such as fixed point delay 504, into components. The CPI analyzer recognized that a dependent fixed point instruction will complete a known number of cycles after its dependencies are satisfied. If the CPI analyzer detects that a load operation finished and then a fixed point operation finished in the deterministic number of cycles afterwards, the CPI analyzer can infer that the fixed point operation was dependent on the load operation. In this case, the load instruction latency is subtracted from the completion stall time to determine the actual delay attributable to the fixed point instruction. In this case, the delay attributable to the fixed point instruction is equal to the dependent fixed point delay.

In this example, fixed point delay and load latency were used as examples. However, the process of illustrative embodiments is applicable to any group of two or more instructions that have deterministic relationships, regardless of the type of instructions and/or type of operation performed by the instruction.

Figure 6:
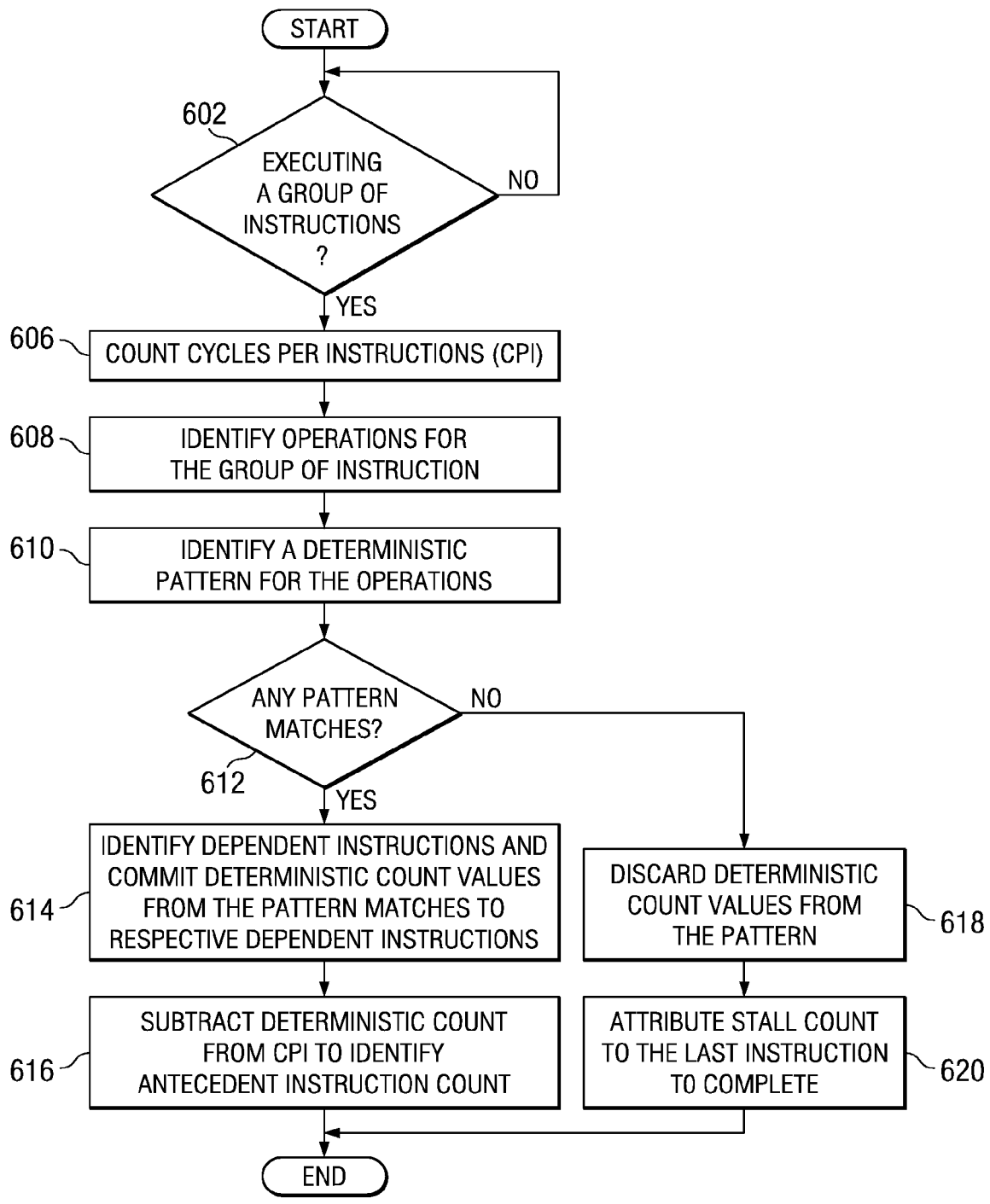
FIG. 6 is a flowchart illustrating a process for performance analysis of a group of instructions in accordance with an illustrative embodiment.

FIG. 6 is a flowchart illustrating a process for performance analysis of a group of instructions in accordance with an illustrative embodiment. In this illustrative example shown in FIG. 6, the process is performed by hardware and/or software components for monitoring a processor performance, comparing cycles per instruction to a pattern of deterministic values, identifying dependent instructions, and identifying a dependent instruction delay, such as performance monitor unit 406 in FIG. 4.

The process begins by determining whether a group of instructions is executing (step 602). If a single instruction is executing, the process returns to step 602. Returning to step 602, if a group of instructions is executing, the process retrieves the count of cycles per instruction for the group of instructions (step 606) from a performance monitor counter, such as performance monitor counter 408 in FIG. 4. The process identifies the type of operations performed by the group of instructions (step 608). The type of operations can be determined based on an opcode in the instruction.

Next, the process identifies a deterministic pattern for the identified operations (step 610). For example, if the operations identified for the group of instructions includes a load and two add operations, the process retrieves deterministic patterns for groups of instructions consisting of a load and two adds. The deterministic patterns provide the expected latency or number of stall cycles that would be expected if one of the instructions were dependent on another instruction in the group. For example, one pattern might include deterministic values for a first add dependent on the load and a second add dependent on the first add. Another deterministic pattern might include deterministic values for a first add dependent on the load and a second add that is not dependent on the load or the add instruction. A third deterministic pattern for the operations in this example could include a pattern in which both add operations are dependent on the load.

The process compares the retrieved CPI count to the deterministic latency patterns to make a determination as to whether any pattern matches are identified (step 612). If a pattern match is found, the process identifies the dependent instruction and commits the deterministic latency count values from the pattern matches to the respective dependent instructions (step 614). In other words, if a pattern match is found, the process identifies one or more dependent instructions based on the pattern match. The process can then determine the dependent instruction delay based on the pattern matching. This dependent instruction delay is committed or attributed to the identified dependent instructions. The process subtracts the deterministic count value from the CPI attributable to the dependent instruction from the pattern to identify a latency attributable to the antecedent instruction (step 616) with the process terminating thereafter.

Returning to step 612, if no pattern matching is found, the process discards deterministic count values from the deterministic latency patterns (step 618) and attributes the stall cycles to the last instruction to complete (step 620) with the process terminating thereafter.

In another illustrative embodiment, the performance monitor unit begins counting cycles when no group of instructions is completing and when completion stall due to load latency has just dropped or ended. If the performance monitor unit determines that a fixed point instruction finishes the appropriate number of cycles after the load instruction completes, the performance monitor unit can commit the count to the dependent fixed point delay. The performance monitor unit can also attribute the count occurring prior to the dependent fixed point delay to the load instruction, which is referred to as the antecedent instruction to the dependent fixed point instruction.

However, if the deterministic number of cycles is exceeded without the fixed point instruction completing, the performance monitor unit discards or disregards the load latency and dependent fixed point delay counts. In this case, the performance monitor unit attributes the entire stall count to the last instruction in the group of instructions to complete. In this case, the entire stall count would be attributed to the fixed point instruction.

Figure 7:
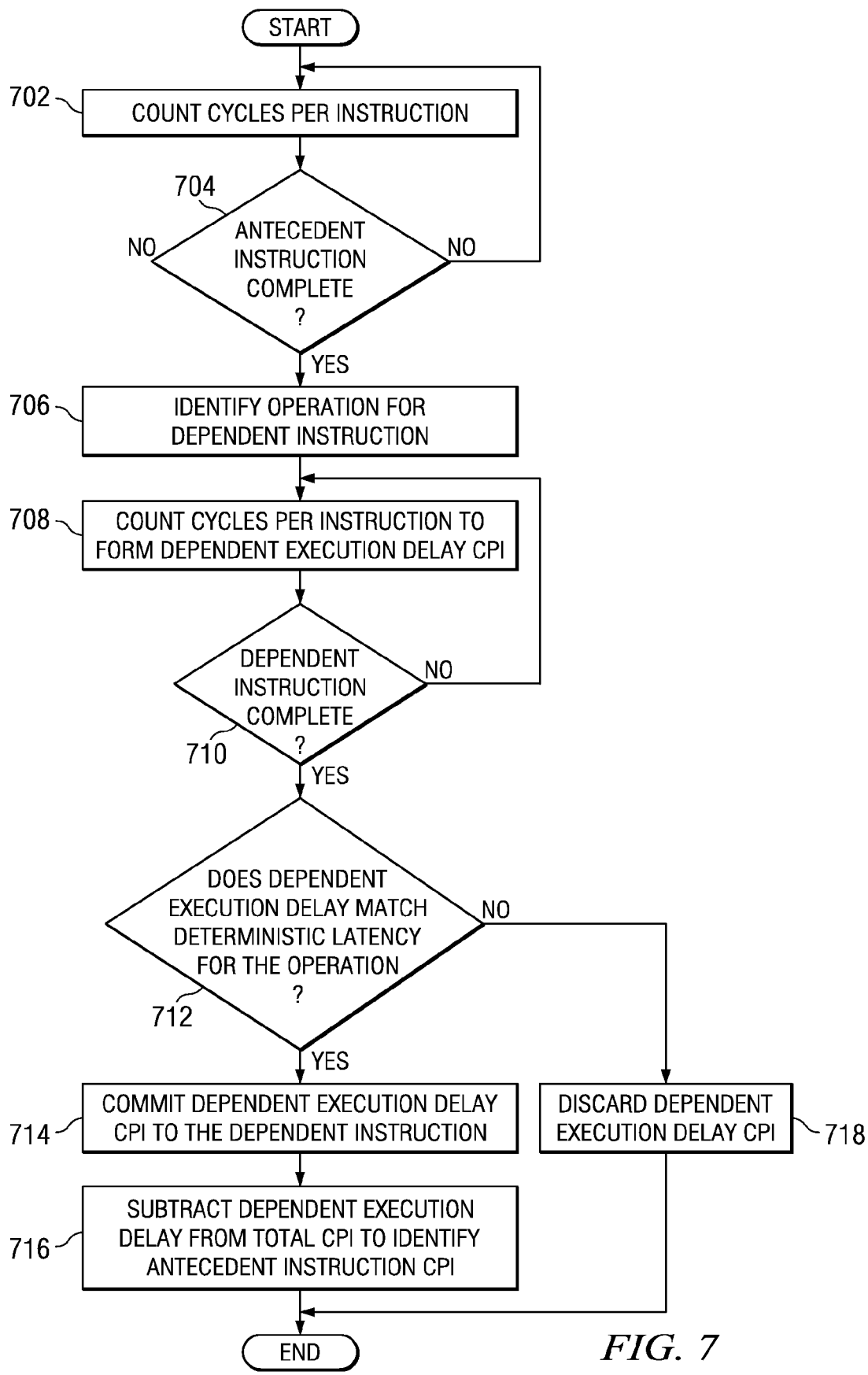
FIG. 7 is a flowchart illustrating a process for stall accounting for dependent instructions in accordance with an illustrative embodiment.

FIG. 7 is a flowchart illustrating a process for stall accounting for dependent instructions in accordance with an illustrative embodiment. In this illustrative example shown in FIG. 7, the process is performed by a software component for analyzing cycles per instruction to identify dependent instructions and dependent instruction latency, such as performance monitor unit 406 in FIG. 4.

The process begins by counting cycles per instruction for a group of instructions (step 702). The process makes a determination as to whether an antecedent instruction is complete (step 704). In other words, the process determines whether a group of instructions has not completed and whether an antecedent instruction has completed. If the process determines that the antecedent instruction is complete, the process identifies an operation performed by the dependent instruction (step 706) and begins counting cycles per instruction to form a dependent instruction delay CPI (step 708).

The process determines whether the dependent instruction is complete (step 710) based on data collected by the performance monitor unit, such as performance monitor unit 406 in FIG. 4. If the instruction is not complete, the process returns to step 708. When the instruction is complete, the process determines whether the dependent execution delay CPI matches a deterministic execution latency for the identified operation (step 712). If a match is found, the process confirms that the instruction is a dependent instruction and commits the dependent execution delay CPI to the dependent instruction (step 714). In other words, the entire stall count is not attributed to the dependent instruction. Instead, only the stall cycles occurring after the antecedent instruction completes is attributed to the dependent instruction. The process subtracts the dependent execution delay CPI from the total CPI for the entire group to identify an execution CPI delay for the antecedent instruction (step 716) with the process terminating thereafter.

Returning to step 712, if the dependent execution delay CPI does not match the deterministic execution latency for the operation, the process discards the dependent execution delay CPI (step 718) and terminates thereafter.

Thus, the illustrative embodiments provide a computer implemented method, apparatus, and computer program product for stall accounting in an instruction pipeline. The process counts a number of stall cycles for a group of instructions to complete execution. The process retrieves a deterministic latency pattern corresponding to the group of instructions.

A deterministic latency pattern corresponding to a group of instructions is a pattern for a group of instructions matching the group of instructions completing execution. For example, if the group of instructions completing execution or that just completed execution includes a load instruction and two add instructions, a corresponding deterministic latency pattern is a latency pattern for a group of instructions having a load instruction and two add instructions. If a deterministic latency pattern is available in the data storage device for a group of instructions having two load instructions and three add instructions, then that deterministic latency pattern would not be a corresponding deterministic latency pattern to the completing group of instructions having a single load instruction and two add instructions.

The process compares the number of stall cycles to the deterministic execution latency pattern. The process identifies the instruction as a dependent instruction in response to a determination that an instruction in the group of instructions completed a deterministic number of cycles after an antecedent instruction completed.

Thus, the illustrative embodiments more accurately and reliably identify dependent instructions and the number of stall cycles attributable to a dependent instruction. A user is able to improve processor performance by identifying the antecedent and dependent instructions responsible for stall cycles.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for monitoring instruction execution in an instruction pipeline, the computer implemented method comprising:

counting, by a performance monitor in a processor, a number of stall cycles for a group of instructions that are being executed by execution units in the processor, wherein the stall cycles are cycles of the processor during which the execution units are executing the group of instructions but none of the group of instructions completes execution;

retrieving a deterministic latency pattern corresponding to the group of instructions;

comparing the number of stall cycles to the deterministic execution latency pattern; and responsive to a determination that an instruction in the group of instructions completed a deterministic number of cycles after an antecedent instruction completed, identifying the instruction as a dependent instruction.

2. The computer implemented method of claim 1 further comprising:

assigning the deterministic number of cycles to the instruction to form a dependent instruction delay.

3. The computer implemented method of claim 2 further comprising:

subtracting the dependent instruction delay from the number of stall cycles for the group to determine an antecedent instruction delay attributable to the antecedent instruction.

4. The computer implemented method of claim 1 wherein the predetermined execution latency pattern includes a deterministic number of cycles expected to occur for a dependent instruction to complete execution after an antecedent instruction completes execution.

5. The computer implemented method of claim 1 further comprising:

identifying a type for each instruction in the group of instructions, wherein the type defines a particular instruction operation; and identifying the deterministic latency pattern from a plurality of different deterministic execution latency patterns based on the identified type of each instruction in the group of instructions, wherein the identified deterministic latency pattern includes pattern instructions that include only the same number of each type of instruction in the group of instructions.

6. The computer implemented method of claim 1 wherein the deterministic latency pattern is retrieved from a plurality of deterministic execution latency patterns hard coded in transistors on a processor chip.

7. The computer implemented method of claim 1 wherein the deterministic latency pattern is retrieved from a plurality of deterministic execution latency patterns stored in memory on a processor chip.

8. A computer program product in which computer readable program code is stored comprising:

a computer readable program medium in which is stored computer readable program code for monitoring instruction execution in an instruction pipeline, said computer program product comprising:

computer readable program code for counting, by a performance monitor in a processor, a number of stall cycles for a group of instructions that are being executed by execution units in the processor, wherein the stall cycles are cycles of the processor during which the execution units are executing the group of instructions but none of the group of instructions completes execution;

computer readable program code for retrieving a deterministic latency pattern corresponding to the group of instructions;

computer readable program code for comparing the number of stall cycles to the deterministic execution latency pattern; and computer readable program code for identifying the instruction as a dependent instruction in response to a determination that an instruction in the group of instructions completed a deterministic number of cycles after an antecedent instruction completed.

9. The computer program product of claim 8 further comprising:

computer usable program code for assigning the deterministic number of cycles to the identified instruction to form a dependent instruction delay.

10. The computer program product of claim 8 further comprising:

computer usable program code for subtracting the dependent instruction delay from the number of stall cycles for the group to determine an antecedent instruction delay attributable to the antecedent instruction.

11. The computer program product of claim 8 wherein the predetermined execution latency pattern includes a deterministic number of cycles expected to occur for a dependent instruction to complete execution after an antecedent instruction completes execution.

12. The computer program product of claim 8 further comprising:

computer usable program code for identifying a type for each instruction in the group of instructions, wherein the type defines a particular instruction operation; and computer usable program code for identifying the deterministic latency pattern from a plurality of different deterministic execution latency patterns based on the identified type of each instruction in the group of instructions, wherein the identified deterministic latency pattern includes pattern instructions that include only the same number of each type of instruction in the group of instructions.

13. The computer program product of claim 8 wherein the deterministic latency pattern is retrieved from a plurality of deterministic execution latency patterns hard coded in transistors on a processor chip.

14. The computer program product of claim 8 wherein the deterministic latency pattern is retrieved from a plurality of deterministic execution latency patterns stored in memory on a processor chip.

15. A microprocessor chip comprising:

a reduced instruction set computer processor, wherein the reduced instruction set computer processor executes a group of instructions in an instruction pipeline;

a performance monitor counter in a processor, wherein the performance monitor counter counts a number of stall cycles for a group of instructions that are being executed by execution units in the processor, wherein the stall cycles are cycles of the processor during which the execution units are executing the group of instructions but none of the group of instructions completes execution; and a cycles per instruction analyzer, wherein the cycles per instruction analyzer retrieves a deterministic latency pattern corresponding to the group of instructions, compares the number of stall cycles to the deterministic execution latency pattern, and identifies the instruction as a dependent instruction in response to a determination that an instruction in the group of instructions completed a deterministic number of cycles after an antecedent instruction completed.

16. The microprocessor chip of claim 15 wherein the microprocessor chip further comprises:
a set of resistors, wherein a plurality of deterministic execution latency patterns are hard coded into the set of resistors.

17. The microprocessor chip of claim 15 wherein the microprocessor chip further comprises:
a memory on the microprocessor chip, wherein a plurality of deterministic execution latency patterns are stored in the memory on the microprocessor chip.

18. The computer implemented method of claim 1, wherein the performance monitor is a hardware component on a microprocessor chip on which the processor is located.

19. The microprocessor chip of claim 15, further comprising:
the processor executing code for identifying a type for each instruction in the group of instructions, wherein the type defines a particular instruction operation; and
the processor executing code for identifying the deterministic latency pattern from a plurality of different deterministic execution latency patterns based on the identified type of each instruction in the group of instructions, wherein the identified deterministic latency pattern includes pattern instructions that include only the same number of each type of instruction in the group of instructions.

* * * * *